J. T. HALL.
TRUCK.
APPLICATION FILED JULY 24, 1919.
1,341,171. Patented May 25, 1920.
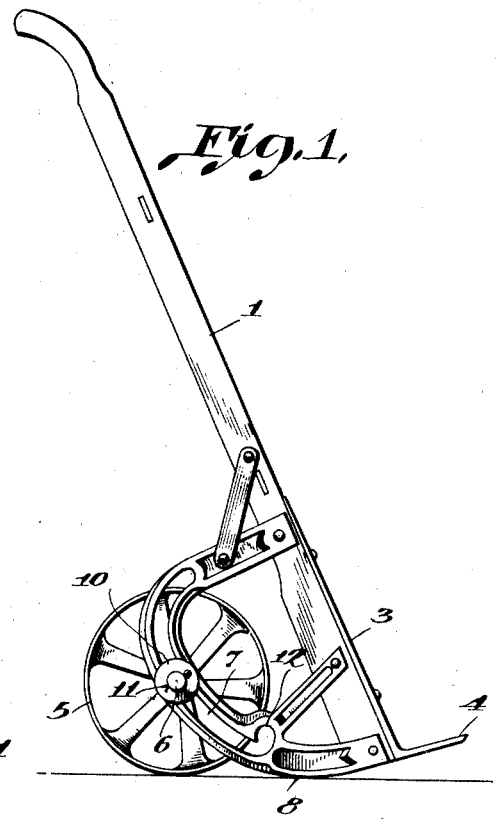
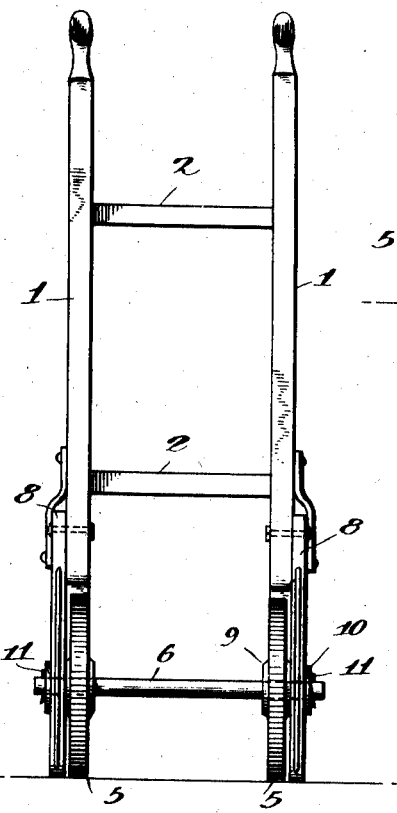
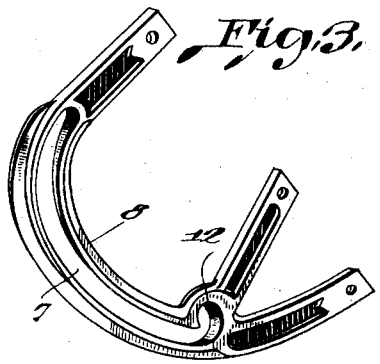
J. T. Hall, INVENTOR
BY
ATTORNEYS

UNITED STATES PATENT OFFICE.

JAMES T. HALL, OF WACO, TEXAS.

TRUCK.

1,341,171.  Specification of Letters Patent.  Patented May 25, 1920.

Application filed July 24, 1919. Serial No. 312,933.

*To all whom it may concern:*

Be it known that I, JAMES T. HALL, a citizen of the United States, and a resident of Waco, in the county of McLennan and State of Texas, have invented certain new and useful Improvements in Trucks, of which the following is a specification.

My invention is an improvement in trucks, and has for its object to provide a truck, especially adapted for railroad use, as for instance, handling baggage, freight and the like, wherein the supporting wheels are so arranged with respect to the body of the truck, that they may be moved longitudinally thereof, to permit the end of the truck to rest directly on the ground in loading, or to raise the body and the load well above the ground during transportation.

In the drawings:—

Figure 1 is an inside view of the improved truck,

Fig. 2 is a rear view, rockers on inside of the frame,

Fig. 3 is a perspective view of one of the connecting brackets.

In the present embodiment of the invention, the truck body is of usual formation, consisting of the handles 1 connected by the cross bars 2 and the front faces of the lower ends of the handles are reinforced by metal straps 3 which have outwardly bent portions 4 upon which the load is adapted to be supported, and which are adapted to be inserted beneath the load in loading.

Wheels 5 which are of usual construction, are fitted to an axle 6 whose ends move in an arc-shaped guideway 7 in brackets 8, which are secured to the handles at the ends remote from the grip by bolts. Referring to Fig. 2, it will be noticed that the wheels have hubs 9 which engage the outer faces of the brackets 8, and washers 10 are arranged on the axle outside of the wheels, the washers being held in place by cotter pins 11.

The ends of the axle are freely movable in the slots or passages 7, the said slots being arranged with their convexity outwardly, and each slot has at the end remote from the grip of the adjacent handle, a recess 12 for receiving the axle, to hold the axle in position when moving the truck forward or backward.

When not in use, the grip portions of the handles are swung forwardly, and the axle rolls down the slots, into the recesses 12, holding the truck thus in upright position, where it takes up but little room and is not in the way. When desired for use, a forward movement of the grip ends of the handles will release the axle from the recesses 12, and the rearward swinging movements of the grips together with the weight of the wheels and truck body will return the parts to the position of Fig. 1.

Referring to Fig. 2, it will be seen that the brackets 8 are outside the truck body, and that the wheels being at the inner sides of the brackets are directly behind the handles. Thus the wheels occupy less space, and present a neater and more sightly appearance.

The present invention is an improvement over my prior Patent #1,201,957 granted October 7, 1916, and dispenses with the use of the latches for holding the axle at the front of the slot 7, attaining all of the advantages of the latches without the necessity for their use.

I claim:—

A truck including a body having handles at one end, rockers adjacent the opposite end of the truck beneath the same, said rockers having registering curved guide slots, and the truck axle moving in the slots, each slot having at its forward end and on the upper side a notch for engagement by the axle to hold it at the front end of the slots.

JAMES T. HALL.